US009672413B2

(12) United States Patent
Yokokawa et al.

(10) Patent No.: US 9,672,413 B2
(45) Date of Patent: Jun. 6, 2017

(54) SETTING OPERATION AREA FOR INPUT ACCORDING TO FACE POSITION

(71) Applicant: Sony Computer Entertainment Inc., Tokyo (JP)

(72) Inventors: Yutaka Yokokawa, Kanagawa (JP); Nicolas Doucet, Kanagawa (JP); Takumi Yoshida, Chiba (JP); Tetsugo Inada, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 16 days.

(21) Appl. No.: 14/438,405

(22) PCT Filed: Oct. 24, 2013

(86) PCT No.: PCT/JP2013/078791
§ 371 (c)(1),
(2) Date: Apr. 24, 2015

(87) PCT Pub. No.: WO2014/073384
PCT Pub. Date: May 15, 2014

(65) Prior Publication Data
US 2015/0278583 A1 Oct. 1, 2015

(30) Foreign Application Priority Data

Nov. 6, 2012 (JP) .................. 2012-244920

(51) Int. Cl.
*G06K 9/00* (2006.01)
*G06F 3/01* (2006.01)
(Continued)

(52) U.S. Cl.
CPC .......... *G06K 9/00268* (2013.01); *G06F 3/011* (2013.01); *G06F 3/017* (2013.01);
(Continued)

(58) Field of Classification Search
CPC .. G06K 9/00268; G06K 9/00375; G06K 9/52; G06F 3/0425; G06F 3/017; G06F 3/0304; G06F 3/011
See application file for complete search history.

(56) References Cited

U.S. PATENT DOCUMENTS 8,781,151 B2    7/2014  Marks
9,081,420 B2    7/2015  Kuno
(Continued)

FOREIGN PATENT DOCUMENTS

JP    2005216061 A    8/2005
JP    2010531520 A    9/2010
(Continued)

OTHER PUBLICATIONS

International Preliminary Report on Patenability and Written Opinion for corresponding application PCT/JP2013/078791, dated May 21, 2015.
(Continued)

*Primary Examiner* — Liliana Cerullo
(74) *Attorney, Agent, or Firm* — Matthew B. Dernier, Esq.

(57) ABSTRACT

Provided is an information processor which readily permits operation input to be made so as to point a position on a screen when an operation input is received from a user using a captured image obtained by imaging the user. The information processor acquires a captured image including a user's face, identifies the position of the user's face included in the acquired captured image, sets an operation area at a position on the captured image determined in accordance with the identified face position, detects a detection target within the operation area, and receives, as a user-pointed
(Continued)

position, a position on the screen corresponding to a relative position of the detected detection target within the operation area.

10 Claims, 10 Drawing Sheets

(51) Int. Cl.
*G06K 9/52* (2006.01)
*G06F 3/03* (2006.01)
*G06F 3/042* (2006.01)
*G06T 7/70* (2017.01)

(52) U.S. Cl.
CPC .......... *G06F 3/0304* (2013.01); *G06F 3/0425* (2013.01); *G06K 9/00375* (2013.01); *G06K 9/52* (2013.01); *G06T 7/70* (2017.01)

(56) References Cited

U.S. PATENT DOCUMENTS

| 2007/0279485 | A1 | 12/2007 | Ohba |
| 2008/0080789 | A1 | 4/2008 | Marks |
| 2010/0141578 | A1 | 6/2010 | Horiuchi |
| 2011/0057875 | A1 | 3/2011 | Shigeta |
| 2011/0181621 | A1 | 7/2011 | Ohba |
| 2012/0057792 | A1* | 3/2012 | Sakai ..................... G06F 3/017 382/190 |
| 2013/0181897 | A1 | 7/2013 | Izumi |
| 2014/0145942 | A1 | 5/2014 | Kuno |

FOREIGN PATENT DOCUMENTS

| JP | 2011081453 A | 4/2011 |
| JP | 2013250882 A | 12/2013 |
| WO | 2007013652 A1 | 2/2007 |
| WO | 2012014590 A | 2/2012 |
| WO | 2012039140 A1 | 3/2012 |
| WO | 2012046432 A1 | 4/2012 |

OTHER PUBLICATIONS

Office Action for corresponding JP application 2014-545643, 6 pages, dated Nov. 17, 2015.
European Search Report for corresponding EP application 13852882.3, 7 pages, dated May 23, 2016.
International Search Report for corresponding application PCT/JP2013/078791, dated Jan. 14, 2014.
Office Action for corresponding CN application 201380057981.7, 16 pages, dated Oct. 17, 2016.

\* cited by examiner

SETTING OPERATION AREA FOR INPUT ACCORDING TO FACE POSITION

TECHNICAL FIELD

The present invention relates to an information processor for displaying an image that matches an operation input from a user using a captured image obtained from imaging the user.

BACKGROUND ART

A variety of methods have been proposed to receive an operation input from a user for use in an information processing system such as a game system. One among such methods is an information processing system designed to image a controller held by the user or the user himself or herself with a camera provided around a display and identify the position of a detection target (e.g., controller or user's hand) from the captured image obtained as a result of imaging so as to receive an operation input from the user. Such an information processing system allows for a user to make an operation input to the information processing system by moving a controller held by himself or herself or his or her own hands in front of a camera.

SUMMARY

An information processing system as described above may receive a user operation input configured to point to a position on a display screen, for example, when asking the user to select one of a plurality of objects displayed on the screen. However, if a captured image is used as an operation input, it may be difficult for the user to make an operation input configured to point to a position on the screen. The reason for this is that the correspondence between the position of the user's own hands or the controller and the position on the screen is difficult to understand and that, depending on the correspondence, the user is required to significantly move his or her body in order to point to a position on the screen.

The present invention has been devised in light of the foregoing, and it is an object of the present invention to provide an information processor, a control method and a control program thereof, and an information storage medium storing the program which readily permit an operation input to be made so as to point to a position on a screen when an operation input is received from a user using a captured image obtained by imaging the user.

An information processor according to the present invention includes a captured image acquisition section, a face position identification section, an operation area setting section, and an operation reception section. The captured image acquisition section acquires a captured image including a user's face. The face position identification section identifies the position of the user's face included in the captured image. The operation area setting section sets an operation area at a position on the captured image determined in accordance with the identified face position. The operation reception section detects a detection target from within the operation area, and receives, as a user-pointed position, a position on the screen corresponding to a relative position of the detected detection target within the operation area.

Further, a control method for an information processor according to the present invention controls an information processor to perform a process that matches an operation input from a user. The control method includes a step of acquiring a captured image including a user's face. The control method further includes a step of identifying the position of the user's face included in the captured image. The control method still further includes a step of setting an operation area at a position on the captured image determined in accordance with the identified face position. The control method still further includes a step of detecting a detection target from within the operation area, and receiving, as a user-pointed position, a position on the screen corresponding to a relative position of the detected detection target within the operation area.

Still further, a program according to the present invention causes a computer to function as a captured image acquisition section, a face position identification section, an operation area setting section, and an operation reception section. The captured image acquisition section acquires a captured image including a user's face. The face position identification section identifies the position of the user's face included in the captured image. The operation area setting section sets an operation area at a position on the captured image determined in accordance with the identified face position. The operation reception section detects a detection target from within the operation area, and receives, as a user-pointed position, a position on the screen corresponding to a relative position of the detected detection target within the operation area. This program may be stored on a computer-readable information storage medium.

DESCRIPTION OF EMBODIMENT

A detailed description will be given below of an embodiment of the present invention on the basis of the accompanying drawings.

Figure 1:
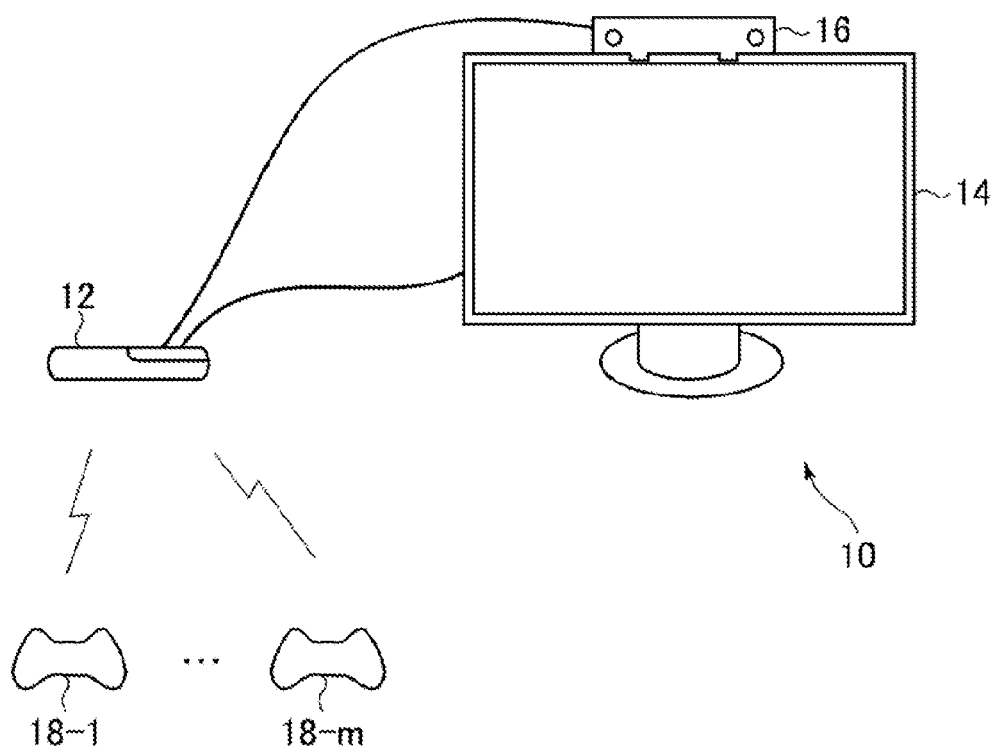
FIG. 1 is an overall configuration diagram of an information processing system according to an embodiment of the present invention.

FIG. 1 is an overall configuration diagram of a game system 10, an example of an information processing system according to an embodiment of the present invention. As illustrated in FIG. 1, the game system 10 includes a game console 12, an example of an information processor according to the present embodiment, a display 14 such as home television receiver with a built-in speaker, a stereo camera 16, and controllers 18 (18-1 to 18-m), each being an example of an operation input device according to the present embodiment.

In the present embodiment, the game console 12 and the display 14 are connected via a cable (e.g., AV cable or HDMI (registered trademark) (High-Definition Multimedia Interface) cable). Further, the game console 12 and the stereo camera 16 are connected via a cable (e.g., USB cable, AV cable, or HDMI cable).

The game console 12 is includes, for example, a control section, a storage section, an image processing section, a sound processing section, a communication section, an optical disc drive, a USB (Universal Serial Bus) port, and an HDMI port. The control section is, for example, an MPU (Micro Processing Unit) configured to operate in accordance with a program installed in the game console 12. The storage section is, for example, storage elements such as ROM and RAM, and a harddisk drive. The image processing section includes a GPU (Graphical Processing Unit) and a frame buffer. The sound processing section includes an SPU (Sound Processing Unit) and a sound buffer. The communication section is a network board or a wireless LAN board configured to exchange data with a server (not shown) on the Internet or the controllers 18 in a wired or wireless manner. The optical disc drive reads an optical disc (computer-readable information storage medium) such as DVD-ROM or Blu-ray (registered trademark) disc. These components are connected in such a manner as to be able to exchange data with each other via a bus.

The GPU included in the image processing section draws a variety of screens in the frame buffer included in the image processing section on the basis of image data supplied from the control section. Each of the screens formed in the frame buffer is converted into a video signal at a given timing and output to the display 14.

The sound buffer included in the sound processing section stores a variety of sound data such as game music, game effect sounds or messages read from an optical disc and the harddisk. The SPU included in the sound processing section plays these various sound data and causes sound data to be output from the speaker built in the display 14 or those built in the controllers 18.

Each of the digital cameras of the stereo camera 16 that are arranged horizontally side by side includes a lens, an imaging element, and so on, and captures an image at given time intervals (e.g., every one-sixtieth of a second), outputting the captured image to the game console 12.

The controllers 18 are operation input devices in the present embodiment and transmit, to the game console 12, signals that match operations performed on the controllers 18 by users. Each of the controllers 18 incorporates directional keys, buttons, a touch sensor, analog sticks, a speaker, various sensors (e.g., acceleration sensor and gyrosensor) used to detect the posture and motion of the controller 18, batteries, and so on.

Further, the controllers 18 can communicate with the game console 12. As illustrated in FIG. 1, the controllers 18 and the game console 12 are connected through wireless communication (e.g., wireless communication compliant with Bluetooth (registered trademark) or other communication standard). However, the controllers 18 and the game console 12 may be connected through wired communication.

The control section of the game console 12 according to the present embodiment scans the statuses of various sections of each of the controllers 18 at given time intervals (e.g., every one-sixtieth of a second), determining the content of operation performed by each user on the basis of the scanned status. It should be noted that the plurality of controllers 18 can be connected to the game console 12, and that the control section performs a variety of processes on the basis of the operation status supplied from each of the controllers 18.

Figure 2A:
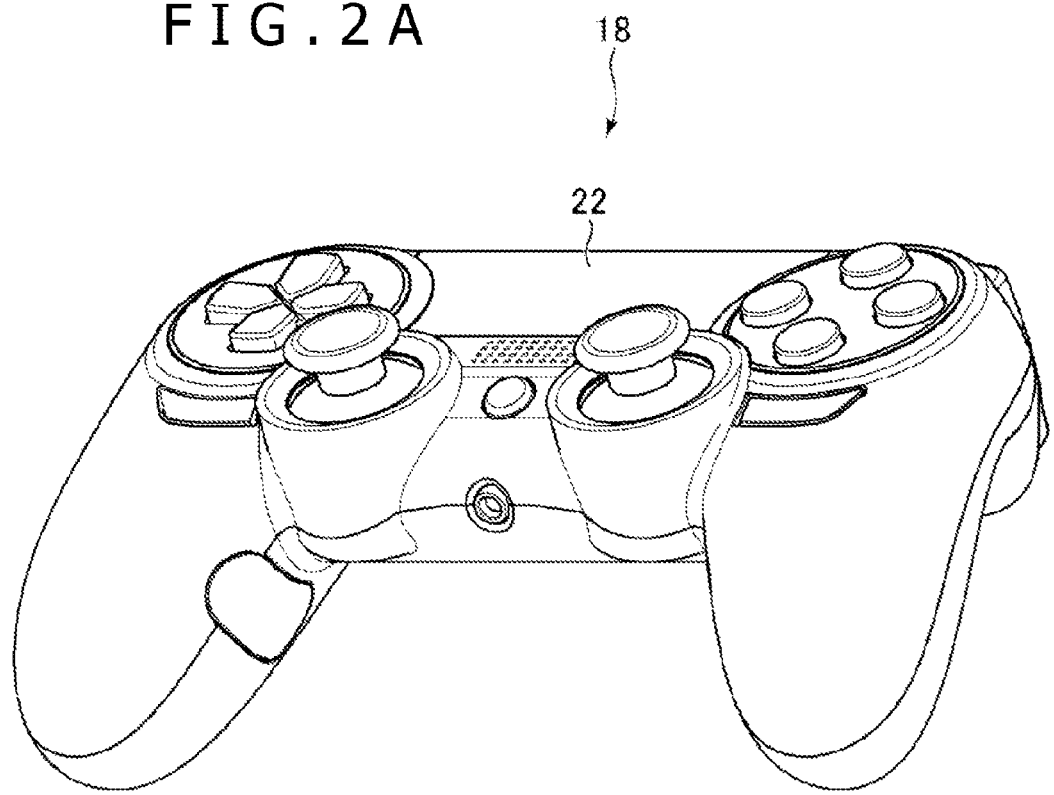
FIG. 2A is a perspective view illustrating an example of appearance of a controller showing an upper side thereof.
Figure 2B:
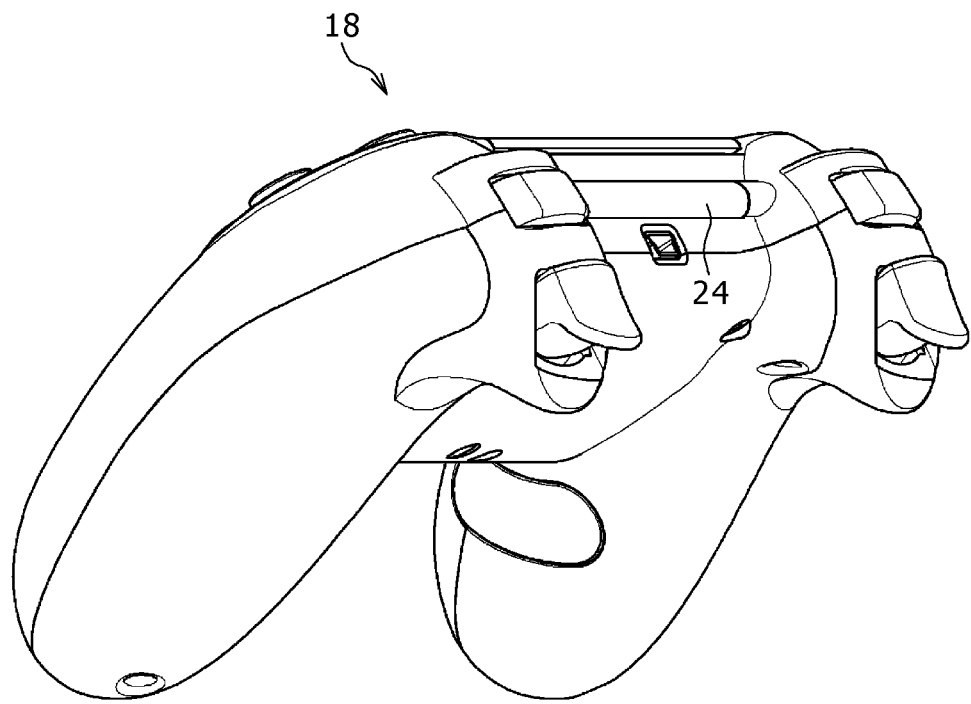
FIG. 2B is a perspective view illustrating an example of appearance of the controller showing a front side thereof.

FIG. 2A is a perspective view illustrating an example of appearance of the controller 18 showing the upper side thereof. FIG. 2B is a perspective view illustrating an example of appearance of the controller 18 showing the front side thereof.

As illustrated in FIGS. 2A and 2B, the controller 18 according to the present embodiment has, at left and right, grip sections to be held by the user. Direction keys are arranged on the upper face of the left grip section. Buttons are arranged on the upper face of the right grip section. Further, the controller 18 according to the present embodiment has a variety of buttons arranged thereon in addition to those arranged on the upper face of the right grip section.

Still further, a plate-shaped operating member 22 including a panel and a touch sensor is arranged on the upper face of a center portion. The center portion connects the front portions of the left and right grip sections. The panel covers the entire touch sensor which is attached to the lower face (back face) of the panel. The touch sensor is capable of detecting the position of an object (e.g., user's finger or stylus) on the detection face (upper face of the plate-shaped operating member 22 in the present embodiment), outputting a signal that matches the detected position of the object. The controller 18 transmits the signal to the game console 12.

The touch sensor is, for example, a capacitive sensor in the present embodiment. Further, the touch sensor is so-called multitouch-capable, thus allowing a plurality of positions of objects on the detection face to be detected at the same time. Still further, the plate-shaped operating member 22 is supported in such a manner as to be able to move vertically in response to pressing by the user. The controller 18 has a switch configured to detect the pressing of the plate-shaped operating member 22. The plate-shaped operating member 22 functions as a button that can be enabled or disabled.

As illustrated in FIG. 2B, a light-emitting section 24 is provided at the front face of the center portion that connects the front portions of the left and right grip sections. The light-emitting section 24 is located between protruding portions of the left and right grip sections. Further, the light-emitting section 24 is horizontally narrow. In the example shown in FIG. 2B, the light-emitting section 24 is in the shape of a linearly extending bar. It should be noted that the shape of the light-emitting section 24 is not limited thereto and may be V-shaped or curved in the shape of an arc, for example.

The game console 12 according to the present embodiment acquires a light of the light-emitting section 24 through the stereo camera 16. The game console 12 subjects the image acquired through the stereo camera 16 to image processing, detecting the position of the controller 18 on the basis of the position and size of the light-emitting section 24 in the acquired image.

The light-emitting section 24 can emit light of an arbitrary color. For example, the light-emitting section 24 includes, for example, red, green, and blue light-emitting bodies (e.g., LEDs) and emits a light of a color specified by the game console 12 or a color that matches the operating condition of the controller 18 by adjusting the luminance of each light-emitting body. Therefore, even if the plurality of controllers 18 are used at the same time, the game console 12 can detect the position of each of the controllers 18.

Further, the controller 18 according to the present embodiment incorporates a speaker in the center portion that connects the front portions of the left and right grip sections. Then, a sound passing hole is formed at the position of the upper face of the center portion corresponding to the position of the speaker. It should be noted that a microphone may be arranged at the position of the sound passing hole together with or in place of the speaker.

Figure 3:
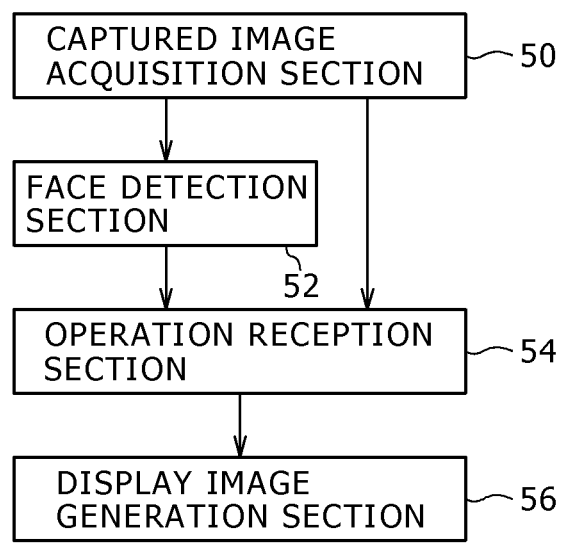
FIG. 3 is a block diagram of a game console.

A description will be given below of the functions implemented by the game console 12 in the present embodiment with reference to the functional block diagram shown in FIG. 3. As illustrated in FIG. 3, the game console 12 functionally includes a captured image acquisition section 50, a face detection section 52, an operation reception section 54, and a display image generation section 56. These functions are implemented as a result of the control section executing the program stored in the storage section of the game console 12. This program may be supplied to the game console 12 via a communications line such as the Internet or supplied thereto stored in an information storage medium, such as optical disc and supplied to the game console 12. These functions allow the game console 12 to implement a game process that matches a user operation and display the processing result on the screen of the display 14. In the present embodiment in particular, the user points to one of the positions on the screen by moving the controller 18 or his or her own hand. In the description given below, such an operation will be referred to as a pointing operation. Whether the user conducts a pointing operation by using his or her own hand or using the controller 18 is determined in accordance with the type of game performed by the game console 12 and its setup. The game console 12 performs a game process that matches the position of the screen pointed to through the pointing operation by the user.

The captured image acquisition section 50 acquires images captured by the stereo camera 16. As described earlier, the stereo camera 16 includes two digital cameras that are arranged horizontally side by side. Each of these digital cameras captures images. The captured image acquisition section acquires one of the images captured by either one of two digital cameras as a reference image Ic1 and the other as a comparative image Ic2. The reference image Ic1 is used as an image to be processed by the face detection section 52 and the operation reception section 54 which will be described later. The comparative image Ic2 is used to generate distance distribution data in the reference image Ic1. Even when the same subject is imaged with two digital cameras, a positional deviation takes place between the position of the subject in the reference image Ic1 and that in the comparative image 1c2 due to parallax. The captured image acquisition section 50 can determine the distance from the stereo camera 16 to the subject by measuring this deviation. More specifically, the captured image acquisition section 50 divides the reference image Ic1 into a plurality of blocks, measuring, for each block, the distance to the subject in the block using the comparative image Ic2. As described above, the captured image acquisition section 50 generates data representing subject distance distribution in the reference image Ic1.

Figure 4:
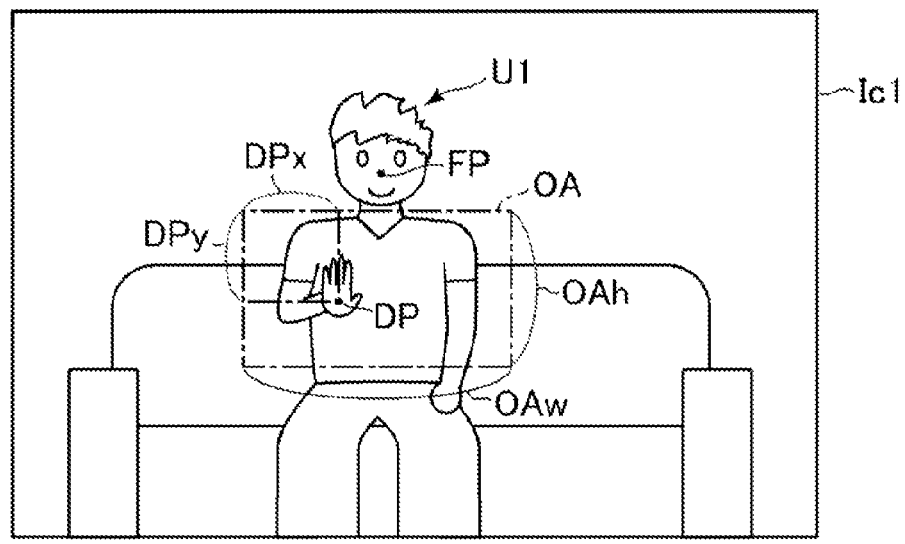
FIG. 4 is a diagram illustrating an example of a reference image captured when a user performs a pointing operation.

The face detection section 52 detects a human face from within the reference image Ic1 acquired by the captured image acquisition section 50, identifying a face position FP in the reference image Ic1. The specific algorithm for the face detection section 52 to detect a face from within the reference image Ic1 may be a known one. It should be noted that if a plurality of faces are detected from within the reference image Ic1, the face detection section 52 needs to determine the correspondence between the user who is actually playing the game and the detected face. For example, if a single player game is in progress, the face detection section 52 may identify, as the user's face, the face detected closest to the center of the reference image Ic1. Alternatively, the face detection section may identify, as the user's face, the largest of all the faces included in the reference image Ic1. Still alternatively, the face detection section 52 may identify, as the user's face, the face closest to the stereo camera 16 (i.e., the frontmost face) using subject distance distribution data described earlier. Still alternatively, if a game for N players is in progress, the face detection section 52 may identify, as faces of the users playing the game, N faces in order from closest to the center, from largest to smallest in size, or from shortest to longest in distance. FIG. 4 is a diagram illustrating an example of the reference image Ic1 that includes the face of the user U1. In FIG. 4, the face detection section 52 detects the face of the user U1, identifying the position coordinates of the center of the detected face as the face position FP.

In response to a user operation, the operation reception section 54 outputs information representing the content of the received operation to the display image generation section 56. In the present embodiment in particular, the operation reception section 54 identifies the position on the screen pointed to by user's pointing operation, outputting the position coordinates thereof to the display image generation section 56. At this time, the operation reception section 54 uses the face position FP in the reference image Ic1 detected by the face detection section 52 as a reference position, setting a position on the reference image Ic1 as an operation area OA. This position is determined in accordance with the face position FP. Then, the operation reception section 54 detects a position of a detection target within the operation area OA, acquiring the position on the screen corresponding to the object position as a user-pointed position. In the description given below, the position where the detection target is detected within the operation area OA will be referred to as a detection position DP, and the position on the screen corresponding to the detection position DP as a pointed position PP. The pointed position PP is a position pointed to by the user through pointing operation. The operation area OA is an area set within the reference image Ic1. However, the pointed position PP is a position on the screen. Therefore, the operation reception section 54 needs to convert the detection position DP within the operation area OA into the pointed position PP on the screen. It should be noted that the detection target (object to be detected by the operation reception section 54) need only be an object that can be moved and used to specify a position. The detection target may be part of the user's body such as his or her own hand or the controller 18 held by the user in the hands. A description will be given below of a case in which one of the user's hands is a detection target as a specific example.

A description will be given below of a specific example of a method for the operation reception section 54 to acquire the pointed position PP. First, the operation reception section sets the operation area OA within the reference image Ic1 using the face position FP. More specifically, the operation area OA is set below the face position FP. The reason for this is that the user is likely to conduct pointing operation by moving his or her own hand only within the range from face down. The size of the operation area OA may be specified in advance. Alternatively, the size thereof may be determined in accordance with the detected face size or the distance from the stereo camera 16 to the detected face. For example, the operation reception section 54 determines the size of the operation area OA so that the larger the detected face size or the shorter the distance to the face, the larger the operation area OA. The reason for this is that the closer the user is to the stereo camera 16, the more likely it is that the motion range of user's hands spreads over a comparatively wide area within the reference image Ic1. Similarly, the distance from the face position FP to the operation area OA may be determined in advance. Alternatively, this distance may be determined in accordance with the detected face size or the distance to the detected face. As described above, the operation area OA is set with reference to the user's face detected by the face detection section 52 in such a manner as to span an area in which the user is likely to move the detection target (user's hand in this case). The shape of the operation area OA is determined to match the shape of a pointable area PA (area in which a position can be pointed to through pointing operation on the screen of the display 14). The pointable area PA may spread over the entire screen of the display 14 or only part of the screen (e.g., windows displayed on the screen). Further, the operation area OA may be in the same shape as the pointable area PA or may be in a shape obtained by changing the aspect ratio of the pointable area PA. As illustrated in FIG. 4, the operation area OA may be rectangular in shape. It should be noted that the upper edge of the operation area OA is arranged lower than the user's face in FIG. 4. However, the operation area OA may partially or entirely overlap the user's face.

Further, in the example of FIG. 4, the operation area OA is set immediately below the face position FP, and the X coordinate of the center position of the operation area OA coincides with the X coordinate of the face position FP. However, the operation area OA may be displaced to the left or right relative to the face position FP. In particular, the operation reception section 54 may change the position of the operation area OA in accordance with which of the left and right hands the user uses for pointing operation. More specifically, for example, if the user uses his or her right hand for pointing operation, the operation reception section 54 sets the operation area OA in such a manner that the operation area OA is centered at a position more leftward (more rightward as seen from the user) than the face position FP in the reference image Ic1. On the other hand, if the user uses his or her left hand for pointing operation, the operation reception section 54 sets the operation area OA in such a manner that the operation area OA is centered at a position more rightward than the face position FP. At this time, the operation reception section 54 may displace the center position of the operation area OA from the face position FP by a predetermined distance or by a distance proportional to the detected face size. Alternatively, the operation reception section 54 may identify the user's right and left shoulder positions respectively when the user uses his or her right and left hands using distance distribution data, thus determining the position of the operation area OA in such a manner that the X coordinate of the center of the operation area OA coincides with the X coordinate of the identified shoulder position. Whether the user is using his or her left or right hand can be identified, for example, in the following manner. That is, when the user begins pointing operation, the operation reception section 54 detects the position of the user's hand using distance distribution data as with the identification process of the detection position DP which will be described later. Then, when the detected position of the user's hand is more toward his or her right hand than the face position FP, the operation reception section 54 determines that the user is using his or her right hand. On the other hand, when the detected position of the user's hand is more toward his or her left hand than the face position FP, the operation reception section 54 determines that the user is using his or her left hand. This allows the operation reception section 54 to set the operation area OA to match which of the left and right hands is being used by the user. Alternatively, when pointing operation is initiated, the game console 12 may intentionally cause the user to use a specific hand of the user by displaying, for example, a message "Please stretch your left hand forward." In this example, the operation reception section 54 can assume that the user will probably use his or her left hand for pointing operation. Therefore, it is only necessary to set the operation area OA at a position more toward the user's left hand.

Next, the operation reception section 54 detects a detection target from within the operation area OA, identifying the position thereof (detection position DP). For example, the operation reception section 54 identifies, as the detection position DP, the position of the object closest to the stereo camera 16 within the operation area OA by using the distance distribution data described earlier. The reason for this is that because the user conducts pointing operation by stretching his or her hand forward, it is likely that the user's hand is located more forward (closer to the stereo camera 16) than other objects within the operation area OA. In FIG. 4, the position of the user's right hand is identified as the detection position DP.

Finally, the operation reception section 54 calculates the position coordinates of the pointed position PP in the pointable area PA by using the relative position coordinates of the detection position DP within the operation area OA. Here, the term "relative position coordinates of the detection position DP" refers to the position coordinates of the detection position DP when a point of the operation area OA is set as an origin. For example, the detection position DP is represented by an X coordinate DPx and a Y coordinate DPy with the origin set at the upper left corner of the operation area OA as illustrated in FIG. 4. We assume here that the horizontal width and the height of the operation area OA are denoted respectively by OAw and OAh, and that the horizontal width and the height of the pointable area PA on the screen are denoted respectively by PAw and PAh. In this case, an X coordinate PPx and a Y coordinate PPy of the pointed position PP within the pointable area PA can be calculated by the following formulae:

$$PPx=(DPx/OAw) \cdot PAw$$

$$PPy=(DPy/OAh) \cdot PAh$$

The operation reception section 54 outputs, to the display image generation section 56, the X and Y coordinates PPx and PPy as information about the pointed position PP. It should be noted that, in contrast to the reference image Ic1 that was captured in the direction of looking at the user from the stereo camera 16, the display image is viewed by the user in the direction opposite thereto. Therefore, it is necessary to horizontally flip the correspondence between the position coordinates within the pointable area PA and those within the operation area OA. More specifically, if the X coordinate DPx of the operation area OA is represented with the origin set at the upper left corner of the operation area OA and the direction to the right as one faces the operation area OA as being a positive direction, the X coordinate PPx of the pointed position PP is represented with the origin at the upper right corner of the pointable area PA and the direction to the left as one faces the pointable area PA as being a positive direction.

Figure 5:
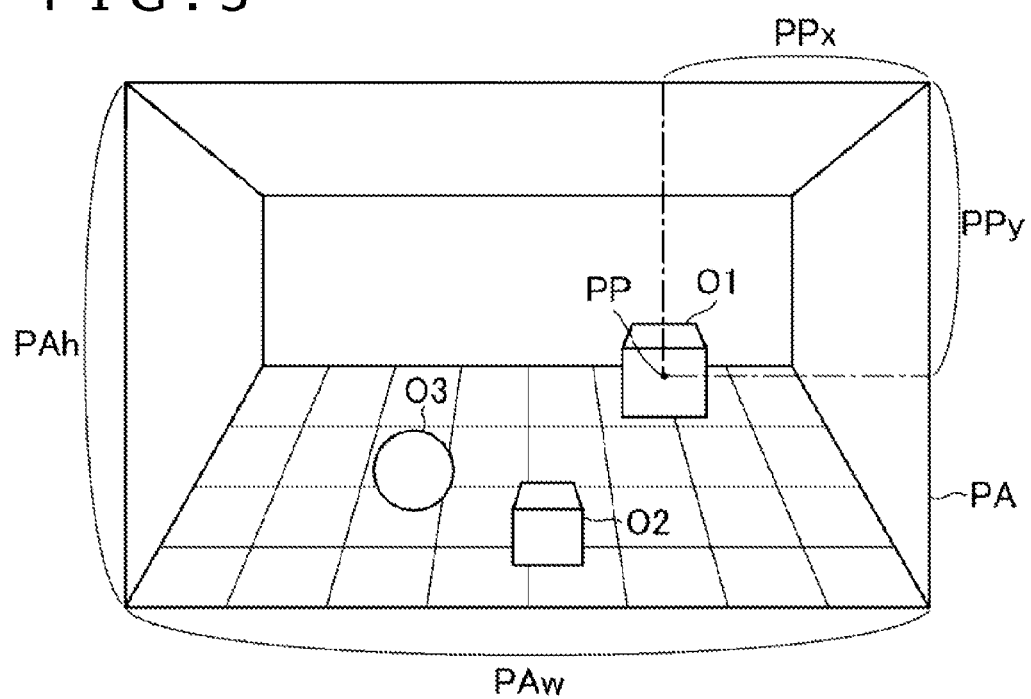
FIG. 5 is a diagram illustrating an example of a display image that is displayed in response to a pointing operation.

The display image generation section 56 performs a game process using information representing the content of operation output from the operation reception section 54, generating a display image representing the result of the game process. The generated display image is drawn in the frame buffer of the game console 12 and displayed on the screen of the display 14. In the present embodiment in particular, the display image generation section 56 performs the process that matches the object (display element) currently being displayed at the pointed position PP pointed to by the user through pointing operation. In FIG. 5, for example, an image is displayed on the screen of the display 14, showing how a plurality of objects (display elements) O1 to O3 are arranged in a three-dimensional space. This screen as a whole is the pointable area PA. Here, if the pointed position PP is placed on the object O1 for a given period of time or more as illustrated in FIG. 5, the display image generation section 56 determines that the user has selected the object O1 through pointing operation. Then, the display image generation section 56 performs a process configured to change the condition of the object O1 in response to the selection, showing a display image that reflects the result of the process. For example, if the user changes a pointed position by moving his or her hand, the display image generation section 56 performs a process configured to move the object O1 along the path of the hand. Further, if the user moves the pointed position into a target area included in the display image with the object O1 selected and maintains the pointed position PP included in the target area for a given period of time or more, the display image generation section 56 may display the selected object O1 that bumps into an object displayed in the target area. It should be noted that the display image generation section 56 may display, on the screen, a marker image representing the current pointed position PP. This allows the user to perform a pointing operation while verifying where the pointed position PP is, thus making it easier to point to an arbitrary position.

Figure 6:
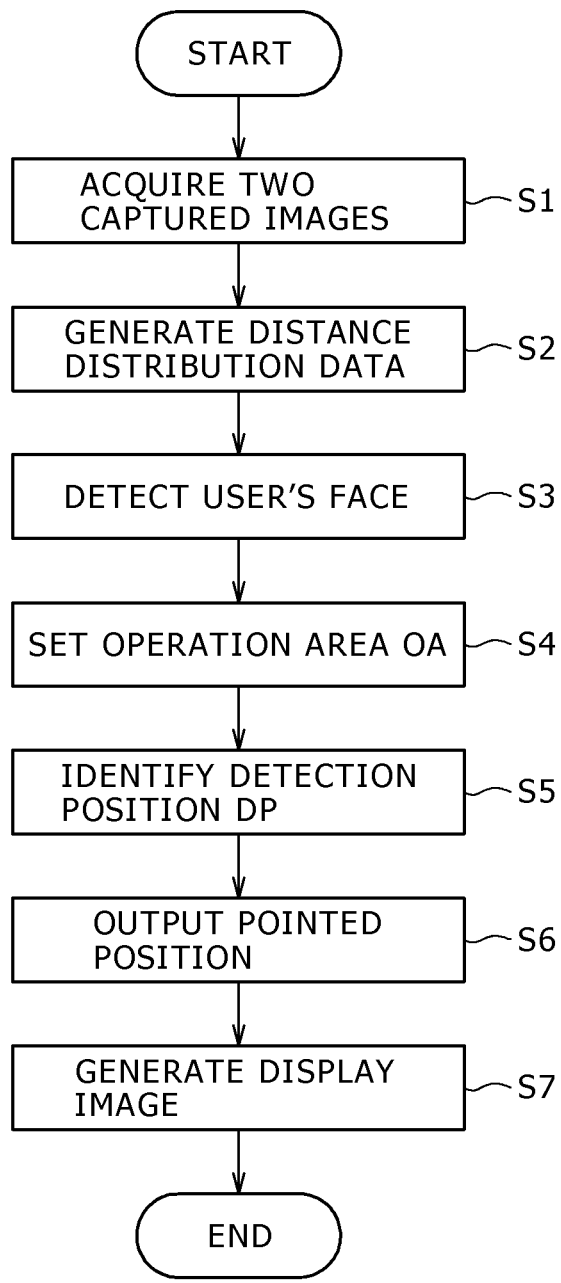
FIG. 6 is a diagram illustrating an example of flow of processes performed by the game console.

A description will be given below of an example of a flow of processes performed by the game console 12 when the user performs a pointing operation with reference to the flowchart of FIG. 6.

First, the captured image acquisition section 50 acquires two images captured by the stereo camera 16, namely, the reference image Ic1 and the comparative image Ic2 (S1). Then, the captured image acquisition section 50 generates distance distribution data of the subject using the two captured images acquired in S1 (S2).

Next, the face detection section 52 detects the user's face from within the reference image Ic1 acquired in S1 (S3). The operation reception section 54 sets the operation area OA within the reference image Ic1 using the face position FP of the user detected in S3 (S4). Further, the operation reception section 54 identifies, as the detection position DP, a peak position within the operation area OA set in S4 (S5). The peak position is where the subject is closest to the stereo camera 16 within the operation area OA, and it is assumed that the user's hand is probably located at the peak position.

Next, the operation reception section 54 calculates the position coordinates of the pointed position PP in the pointable area PA using the relative position coordinates of the detection position DP within the operation area OA identified in S5, outputting the position coordinates to the display image generation section 56 (S6). The display image generation section 56 performs a game process using, as an operation input from the user, the position coordinates of the pointed position PP calculated in S6, generating a new display image (S7). This game process reflects the user operation performed on the object currently being displayed at the pointed position PP on the screen. The display image generated in S7 is displayed on the screen of the display 14.

The game console 12 performs the processes from S1 to S7 described above, for example, each time a single frame rate of the display 14 elapses.

Figure 7:
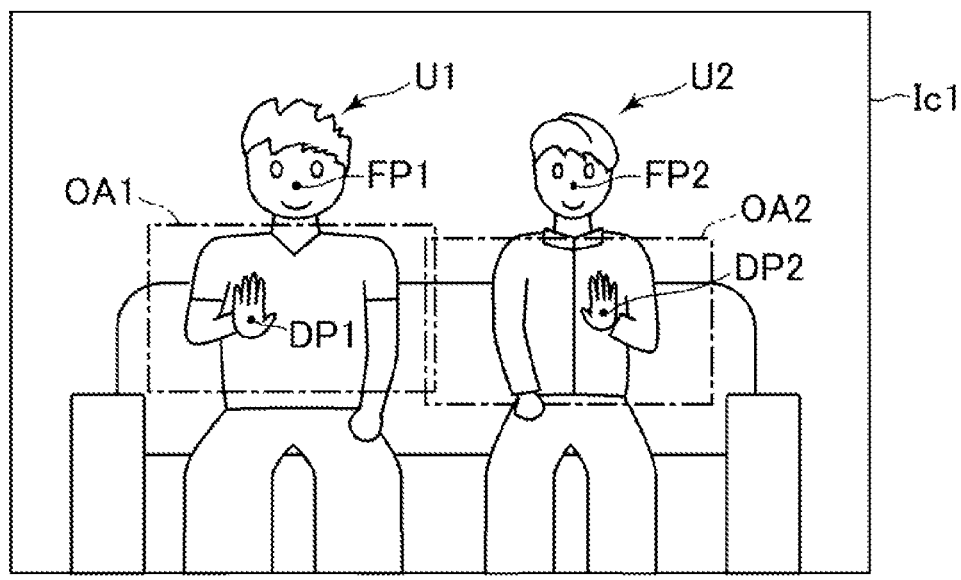
FIG. 7 is a diagram illustrating an example of a reference image captured when a plurality of users perform pointing operations.

Pointing operation described above can be performed by a plurality of users at the same time. FIG. 7 illustrates an example of the reference image Ic1 in this case. In the example of FIG. 7, the users U1 and U2 are imaged by the stereo camera 16. The face detection section 52 detects a face position FP1 of the user U1 and a face position FP2 of the user U2 from within the reference image Ic1. Then, the operation reception section 54 sets an operation area OA1 within the reference image Ic1 on the basis of the position of the face position FP1, detecting the hand position of the user U1 as a detection position DP1 from within the operation area OA1. Similarly, the operation reception section 54 sets an operation area OA2 within the reference image Ic1 on the basis of the position of the face position FP2, detecting the hand position of the user U2 as a detection position DP2 from within the operation area OA2. Finally, the operation reception section 54 calculates the position coordinates of a pointed position PP1 within the pointable area PA using the relative position coordinates of the detection position DP1 within the operation area OA1 and calculates the position coordinates of a pointed position PP2 within the pointable area PA using the relative position coordinates of the detection position DP2 within the operation area OA2. In this manner, the game console 12 can receive pointing of the pointed position PP1 by the user U1 and that of the pointed position PP2 by the user U2 at the same time. Here, the operation areas OA1 and OA2 are set at different positions within the reference image Ic1. However, the pointed positions PP1 and PP2 are calculated as positions within the same pointable area PA. Therefore, the two users can perform pointing operation to point to positions within the same pointable area PA by moving their hands independently in front of their bodies at positions distant from each other.

Further, in the above description, we assumed that the user performed a pointing operation by using his or her hand. However, the present embodiment is not limited thereto, and the user may perform a pointing operation by using the controller 18. In this case, the user holds the controller 18 with his or her hands with the light-emitting section 24 thereof directed toward the stereo camera 16, performing a pointing operation by moving the controller 18 in front of his or her own body. The operation reception section 54 sets the operation area OA within the reference image Ic1 on the basis of the face position FP, and then detects the position of a light emitted from the light-emitting section 24 from within the operation area OA. This position of the light serves as the detection position DP. It should be noted that if each of the plurality of users performs a pointing operation by holding the controller 18, the game console 12 can distinguish between and detect the positions of the controllers 18 by causing the light-emitting sections 24 of the plurality of controllers 18 to emit lights of different colors as described earlier. Further, the device held by the user is not limited to the controller 18. Instead, the user may perform a pointing operation by holding, for example, a portable device having a compact display screen. In this case, the user holds the portable device with a given code image being displayed on the screen of the portable device and with the screen directed toward the stereo camera 16, performing a pointing operation by moving the position of the portable device. In response thereto, the operation reception section 54 detects the code image within the operation area OA through pattern recognition, thus identifying the detection position DP.

The game console 12 according to the present embodiment can receive a variety of operation inputs from the user in addition to a pointing operation and display a variety of images on the screen of the display 14 in accordance therewith. A description will be given below of specific examples of image display processes handled by the game console 12.

For example, the display image generation section 56 may update a display image in accordance with not only the pointed position PP but also the face position FP. More specifically, the display image generation section 56 may move the position of the viewpoint set in a virtual three-dimensional space in accordance with the movement of the face position FP within the reference image Ic1, thus generating a display image that represents the virtual three-dimensional space as seen from the viewpoint. Further, the face detection section 52 can identify not only the vertical and horizontal motion of the user's face but also the longitudinal motion thereof (change in distance from the stereo camera 16 to the user's face) by using the distance distribution data generated by the captured image acquisition section 50. The display image generation section 56 may move the position of the viewpoint longitudinally in response to the movement of the user's face identified as described above. This makes it possible for the display image generation section 56 to move the position of the viewpoint in the virtual three-dimensional space in step with the movement irrespective of in which direction, vertically, longitudinally, or horizontally, the user moves his or her face in front of the stereo camera 16. As a result, the user can experience a sensation as if he or she were actually in a virtual three-dimensional space. It should be noted that if the game console 12 executes a game for a plurality of players with a plurality of users' faces present in the reference image Ic1, the display image generation section 56 may move the viewpoint relative to one face selected from among the plurality of faces (e.g., face at the most elevated position within the reference image Ic1). Further, the display image generation section 56 may update the display image not only on the basis of the face position FP of the user, the pointed position PP, and the nature of operation input made into the controller 18 by the user but also on the basis of a sound produced by the user. In this case, for example, a sound collection device (e.g., microphone array) is installed in the stereo camera 16. The sound collection device can identify the direction in which a sound is produced. If the user claps his or her hands or raises his or her voice, the display image generation section 56 identifies the direction in which the sound was generated using the audio collected by the sound collection device, performing a game process that matches the direction (e.g., moving an object toward the direction in which the sound was generated). Then, the display image generation section 56 generates a display image that reflects the content of game process, displaying the image on the display 14.

Further, the display image generation section 56 may generate a display image by arranging a variety of objects (display elements) in the reference image Ic1 itself acquired by the captured image acquisition section 50. Still further, in this example, the operation reception section 54 not only receives an operation performed on the controller 18 but also identifies the position of the controller 18 within the reference image Ic1 by detecting a light emitted from the light-emitting section 24. Then, the display image generation section 56 determines the position of the object to be displayed on the screen in accordance with the content of operation performed by the user on the controller 18 on the basis of the position of the controller 18 within the reference image Ic1. As a result, when the user operates the controller 18 in his or her hands while watching himself or herself appearing on the screen of the display 14, the display image is updated relative to the position of the controller 18 operated by the user on the screen. Therefore, the user can experience a sensation of more directly operating the object on the screen.

Figure 8:
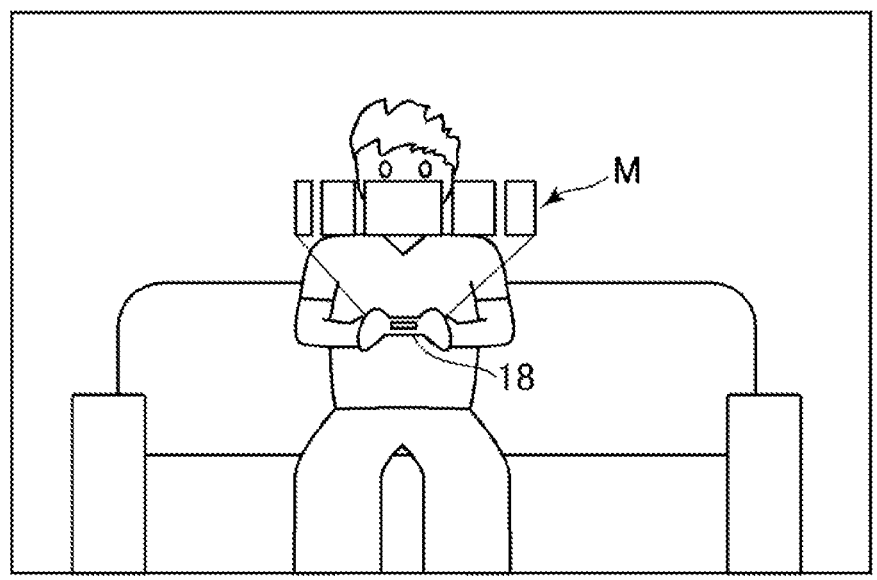
FIG. 8 is a diagram illustrating an example of a display of a menu.

As a specific example of such a process, the display image generation section 56 may display a menu at a position corresponding to that of the controller 18 when the user performs an operation configured to call the menu on the controller 18. FIG. 8 illustrates an example of a display in this case. In the example shown in FIG. 8, if the user presses a button provided on the controller 18 to display a menu, the operation reception section 54 detects the position of the controller 18 from within the reference image Ic1 in response to the operation. Then, the display image generation section 56 generates a display image in which a menu image M appears above the detected position of the controller 18 in a manner overlapped on the reference image Ic1. The menu image M includes a plurality of menu options.

Figure 9:
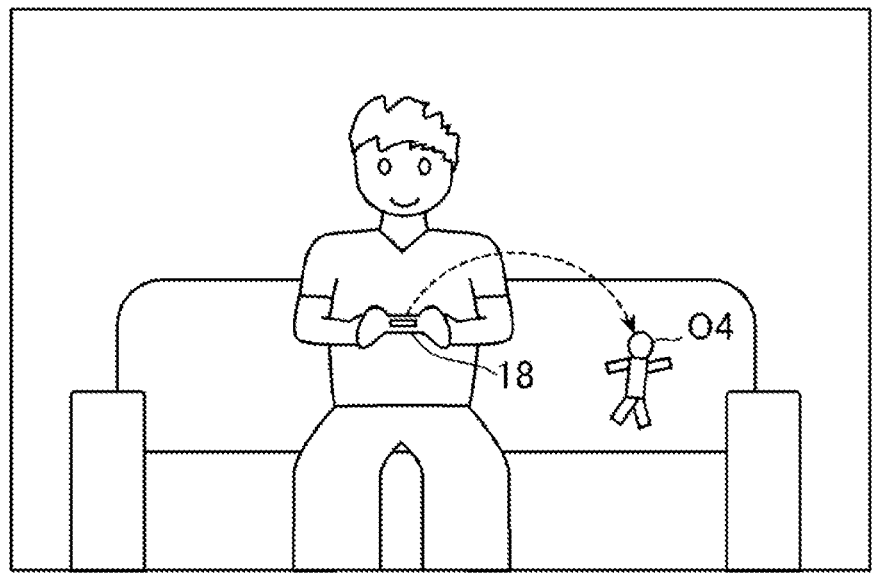
FIG. 9 is a diagram illustrating an example of a display that an object jumps out of a display position of a controller.

Further, if the user performs an operation on the controller 18, the display image generation section 56 may display an object jumping out of the display position of the controller 18 on the screen. FIG. 9 illustrates an example of a display in this case. In this example, if the user operates the plate-shaped operating member 22 of the controller 18, the display image generation section 56 generates a movie showing an object O4 jumping out of the controller 18 in the reference image Ic1, displaying the movie on the screen of the display 14. It should be noted that a dashed line arrow in FIG. 9 represents the path of the object O4 on the screen, and that the object O4 emerges on the screen from the position of the controller 18 as shown in FIG. 9. Further, if, after that, the user moves the controller 18 close to the object O4 that jumped out of the controller 18 by a given distance and then presses a specific operation button, the display image generation section 56 may display that the object O4 is sucked into the controller 18 on the screen. Further, if the object O4 produces an effect such as crying or making an engine sound, the sound of the object O4 may be played from the speaker provided on the display 14 when the object O4 is outside the controller 18 and played from the speaker provided on the controller 18 after the object O4 has been sucked into the controller 18. Such an effect provides the user with a sensation close to directly operating the object O4 in the real world. Such control makes it possible, for example, to produce an effect such as displaying champagne blowing out of the position of the controller 18 within the display image if the user swings the controller 18 sideways to make believe that the controller 18 is a champagne bottle and then performs a sliding operation on the plate-shaped operating member 22. At this time, the user's motion of swinging the controller 18 sideways is identified by the movement of a light emitted from the light-emitting section 24 and the output of a sensor incorporated in the controller 18. Further in this case, more lifelike effects can be produced by producing a sound from the speaker incorporated in the controller 18 or generating vibration with a motor incorporated in the controller 18 in accordance with the swinging of the controller 18 by the user or the operation performed by the user on the plate-shaped operating member 24.

Still further, if a plurality of faces are in the reference image Ic1, the display image generation section 56 may identify the face of the user operating the controller 18 from among the plurality of faces using the position of the controller 18 and subject the identified user's face to image processing. The reference image Ic1 may show not only the face of the user holding the controller 18 with his or her hands but also those of other persons who are simply watching the game. In this case, it is generally difficult to distinguish the user's face without using a face recognition technique configured to identify an individual from a face image. In the present embodiment, however, the position of the controller 18 within the reference image Ic1 can be identified. As a result, it is possible to determine that the face, located at the position corresponding to that of the controller 18, is the user's face. More specifically, if the face detection section 52 detects a plurality of faces, the operation reception section 54 identifies the position of the controller 18 currently in use by detecting a light emitted from the light-emitting section 24 included in the reference image Ic1. Then, the operation reception section 54 determines that, among the plurality of faces detected by the face detection section 52, the face located above the position of the controller 18 is the face of the user who is using the controller 18. The reason for this is that unless the upper body of the user is significantly tilted, the controller 18 is likely to be located below the face of the user who is holding the controller 18. Once the user's face is identified as described above, it is possible to display the user's face on the screen after subjecting it to some kind of image processing.

It should be noted that we assume, in the above description, that a single user operates the controller 18 which he or she is holding. However, the display processes described above can be performed even when each of a plurality of users has and operates the controller 18. In this case, the game console 12 assigns a different identification number to each of the controllers 18 and instructs the light-emitting section 24 of each of the controllers 18 to emit a light of a color different from those of the other controllers 18. Then, the game console 12 stores a table showing the correspondence between the identification numbers assigned to the controllers and the colors of lights which the controllers 18 are instructed to emit. Then, if an operation input is received from one of the controllers 18, the color corresponding to the identification number of the controller 18 which made the operation input is identified using the table, thus identifying the position of the light-emitting section 24 which is emitting the light of the color in question as the position of the controller 18. This makes it possible, even when a plurality of users are playing a game by holding the controllers 18 at the same time and when an operation is received from each of the users, to identify the position of the controller 18 held by the user who performed the operation and the position of his or her face.

Figure 10:
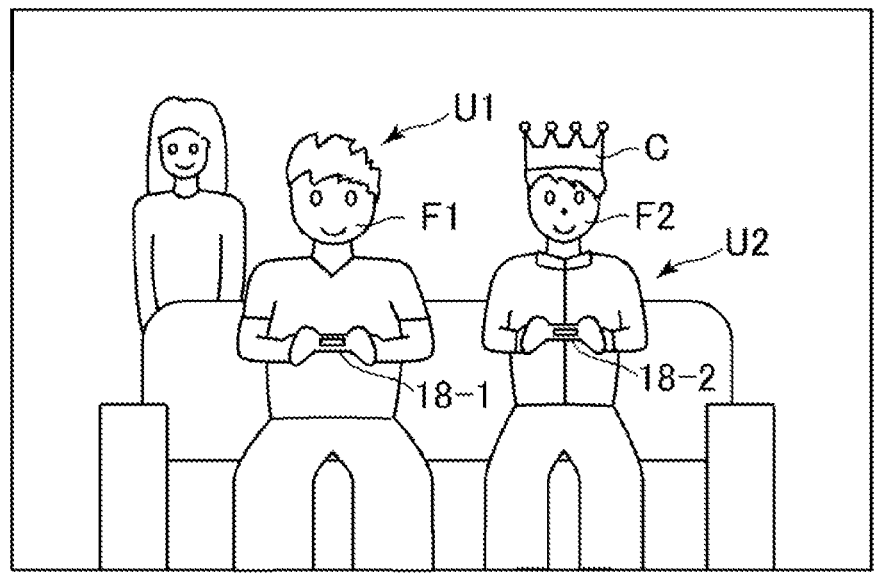
FIG. 10 is a diagram illustrating an example of a display that identified users' faces undergo image processing.

FIG. 10 illustrates an example in which when the two users U1 and U2 and other viewers are in the reference image Ic1, the face of each of the users U1 and U2 is identified, and the identified faces are subjected to image processing. In the example of FIG. 10, the user U1 has the controller 18-1 to which an identification number 1 is assigned, and the user U2 has the controller 18-2 to which an identification number 2 is assigned. Then, the operation reception section 54 identifies the positions of the controllers 18-1 and 18-2 with the colors of emitted lights, identifying a face F1 above the controller 18-1 as the face of the user U1 and a face F2 above the controller 18-2 as the face of the user U2. Then, a display image is generated for the face of the user with the better score (user U2 in the example of FIG. 10), of the users U1 and U2, in the game that is currently played. The display image shows that the user with the better score has a crown C on his head. Then the display image is displayed on the screen. It should be noted that the faces of the users with bad scores rather than the users with good scores of the plurality of users may be subjected to some kind of image processing.

Further, when generating a display image by overlaying an object on the reference image Ic1, the display image generation section 56 may perform a variety of processes in accordance with the positional relationship between the position of the controller 18 and the on-screen object in the display image. For example, the display image generation section 56 may change the behavior of the object in response to the operation performed on the controller 18 by the user between two cases, one in which the object to be operated is located within a given distance range from the position of the controller 18 and another in which the object is not located therewithin.

Still further, the display image generation section 56 may control the behavior of the object in accordance with the distance between the user's hand displayed in the display image and the object arranged in the display image. In this case, the position of the user's hand can be identified as the pointed position PP using the distance distribution data of the reference image Ic1 as described earlier. For example, the display image generation section 56 may set a given area around the user's hand within the display image. If an object is displayed outside the given area, the display image generation section 56 may move the object toward the user's hand and stop the movement of the object when the object enters the given area. Still further, if the user moves his or her hand in such a manner as to overlay the hand on the object, the display image generation section 56 may exercise control so that the object moves away from the pointed position PP. Still further, the display image generation section 56 may monitor the movement of the hand (change over time) and change the orientation or shape of the object in accordance with the movement. This makes it possible to produce an effect as if the on-screen object responded to the movement of the user's hand.

Figure 11:
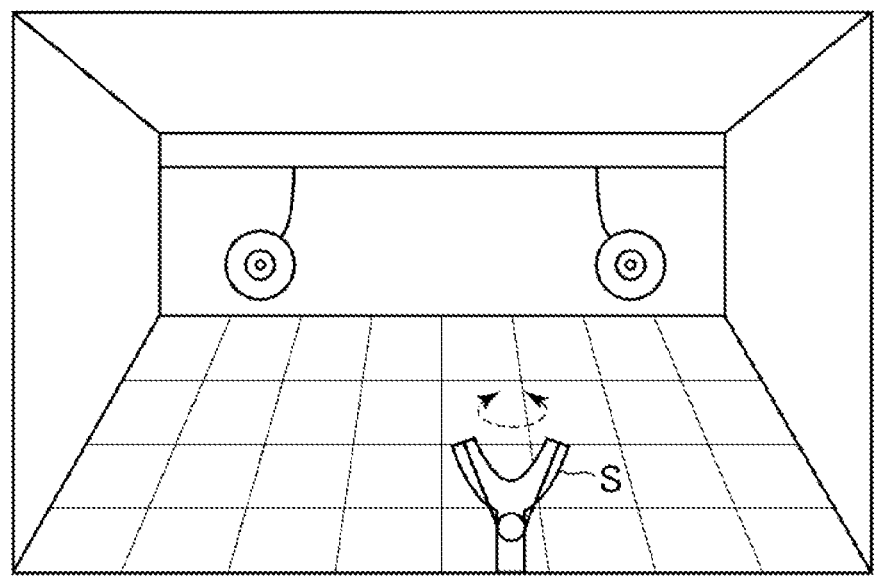
FIG. 11 is a diagram illustrating an example of a display image that is displayed if a content of the image displayed on the screen changes in accordance with a posture of the controller.

Further, the operation reception section 54 may acquire information representing the posture of the controller 18 detected by a sensor provided on the controller 18, and the display image generation section 56 may change the content of the image displayed on the screen in accordance with the posture of the controller 18. FIG. 11 illustrates an example of a display image that is displayed as a result of such a process. In the example of FIG. 11, the operation reception section 54 detects the orientation of the controller 18 using the detection result of a posture detection sensor incorporated in the controller 18 such as acceleration sensor or gyrosensor. The display image generation section 56 changes the orientation of a sling S displayed on the screen as illustrated by dashed line arrows in FIG. 11 in response to the change in orientation of the controller 18. Then, when the user, for example, slides his or her finger in either of the directions on the plate-shaped operating member 22, a bullet is shot in response to the sliding operation. At this time, the direction in which the bullet travels is determined in accordance with the orientation of the controller 18. Therefore, the user can play a game of moving the sling, aiming at the target, shooting a bullet, and hitting the target with a more real-life motion. It should be noted that the direction in which a bullet is shot in this case may be determined not only on the basis of the orientation of the controller 18 but also on the basis of the orientation of the sliding operation performed on the plate-shaped operating member 22. More specifically, we assume, for example, that the controller 18 is rotated θx degrees relative to the reference posture (posture at the start of the game), and further that the orientation of the sliding operation performed by the user is tilted θy degrees relative to the front of the controller 18. In this case, the orientation in which the bullet is shot is set to a direction tilted by (θx+θy) degrees relative to the reference direction at the start of the game.

Further, in the above description, the operation area OA was determined within the reference image Ic1 on the basis of the face position FP. However, the pointable area PA set on the screen may also be determined in accordance with the position of a human face detected from the reference image Ic1. A description will be given below of a specific example of a process in this case with reference to FIGS. 12A and 12B.

Figure 12A:
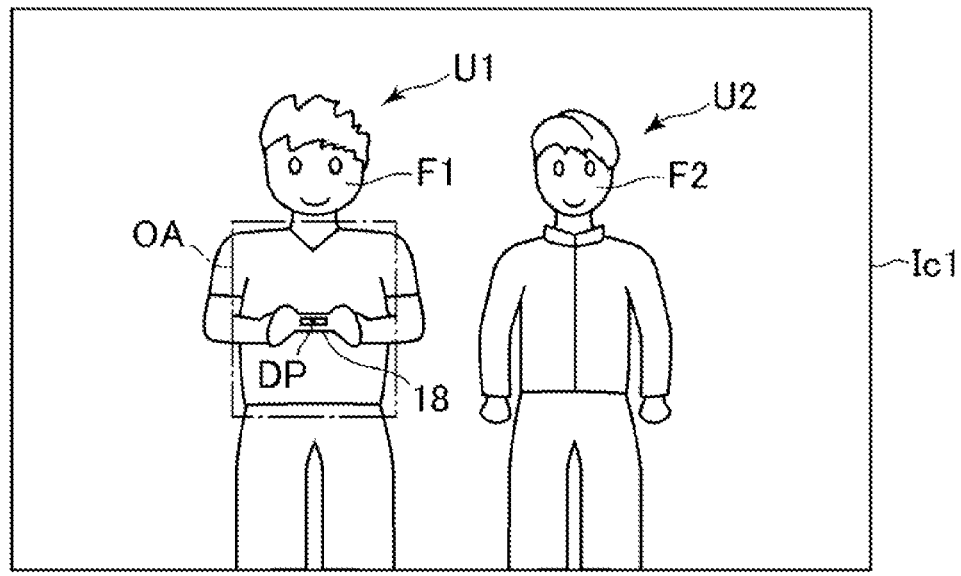
FIG. 12A is a diagram illustrating an example of a reference image when an area that can be pointed to is determined in accordance with a position of a user's face.
Figure 12B:
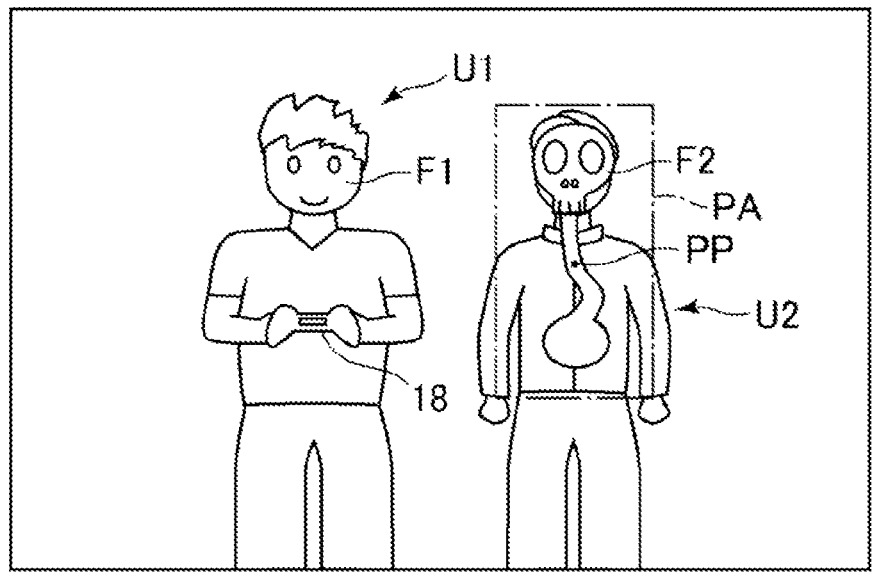
FIG. 12B is a diagram illustrating an example of a display image when an area that can be pointed to is determined in accordance with a position of a user's face.

FIG. 12A is an example of the reference image Ic1 acquired by the captured image acquisition section 50. On the other hand, FIG. 12B is an example of a display image generated by the display image generation section 56. The users U1 and U2 are in the reference image Ic1 of FIG. 12A. The user U1 performs game operations using the controller 18. The user U2 is a target for game operations by the user U1. The face detection section 52 detects the face F1 of the user U1 and the face F2 of the user U2. Here, the face above the position of the controller 18 is identified as the face F1 of the user U1 performing game operations. Further, if a plurality of individuals are in the reference image Ic1, the face closest to the user U1 is identified as the face F2 of the user U2 subject to operations. As described earlier, the operation area OA is determined in accordance with the position of the face F1 of the user U1. Further, in this example, the pointable area PP is determined in accordance with the position of the face F2 of the user U2. More specifically, in the example of FIG. 12B, the pointable area PA is set as a rectangular area that includes the upper body of the user U2 which is centered around a position below the face F2. The position and size of the pointable area PA may be determined in accordance with the detected size of the face F2. Further, in the example of FIG. 12B, a display image is generated by overlaying a different image on the reference image Ic1 within the pointable area PA. Here, if the user U1 moves the controller 18 within the operation area OA, the pointed position PP moves in response to the movement of the controller 18 within the pointable area PA overlaid on the body of the user U2. This makes it possible for the user U1 to perform game operations within the image arranged on the body of the user U2.

Figure 13A:
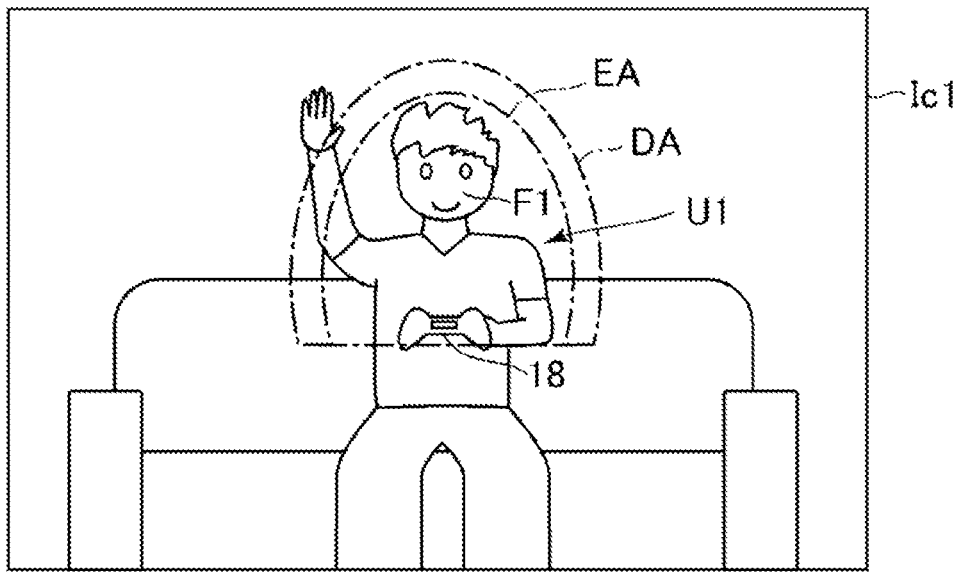
FIG. 13A is a diagram illustrating an example of a reference image when a car maneuvering game process is performed.
Figure 13B:
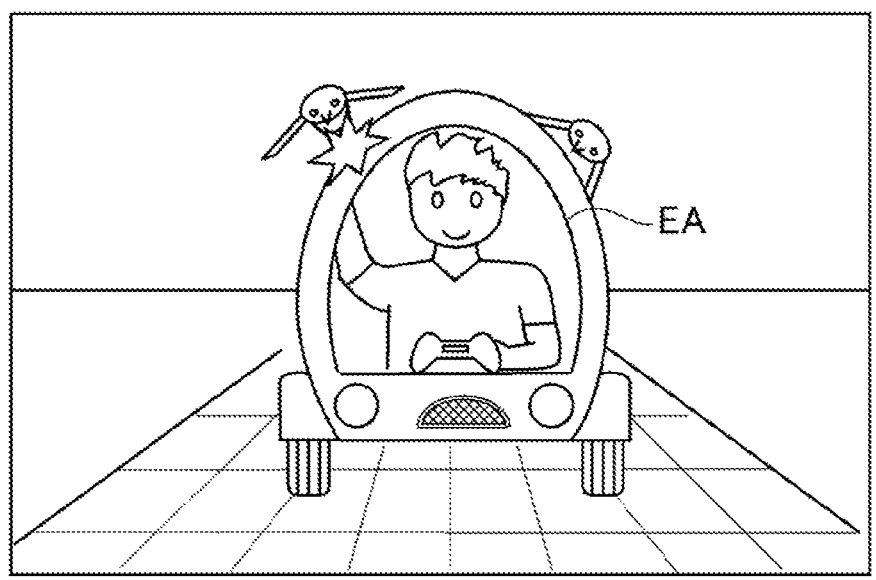
FIG. 13B is a diagram illustrating an example of a display image when a car maneuvering game process is performed. The diagram illustrates another example of the display image.

FIG. 13A illustrates an example of a reference image when still another game process is performed by the game console 12 according to the present embodiment. FIG. 13B illustrates an example of a display image in this case. In this example, the user U1 plays a game of maneuvering a car being displayed on the screen by steering the steering wheel using the controller 18. More specifically, the operation reception section 54 identifies the position of the controller 18 included in the reference image Ic1 first, thus identifying the face located above the controller 18 as the face F1 of the user U1 who is playing the game. When generating a display image, the display image generation section 56 extracts an extraction area EA near the identified face F1 from within the reference image Ic1, overlaying the extraction area EA at the position of the display image where a car object is displayed. This makes it possible for the user to enjoy the game with his or her face shown inside the car within the display image.

Further, in this example, a detection target area DA is set within the reference image Ic1 in accordance with the position of the user's face. More specifically, the detection target area DA is set in such a manner as to surround the extraction area EA in the example of FIG. 13A. The operation reception section 54 can sense the movement of the user's hand within the detection target area DA by detecting the change in the image within the detection target area DA over time. In response to such sensing of the movement of the user's hand, the display image generation section 56 performs a process of changing the object arranged at a position on the display image corresponding to the position of the sensed user's hand. More specifically, FIGS. 13A and 13B show that an object O5, arranged at a position on the screen corresponding to the position of the user's left hand, is knocked away in response to the movement of the user's left hand.

Still further, in this example, control may be exercised so that the user playing the game is switched to other user in accordance with the position of the detected face F1. As a specific example, if the game console 12 receives a given operation input from the controller 18-2 owned by the other user U2 with the user U2 close to the position of the face F1 of the user U1 who is playing the game, the game console 12 switches the game-playing user from the user U1 over to the user U2 and moves the car in response to the input from the controller 18-2 from that moment onward. On the other hand, even if the user U2 makes an operation input for changing the users at a position distant from the user U1, the game console 12 ignores that operation input. In the example of FIGS. 13A and 13B in particular, the game console 12 may receive an instruction to change the users when the face of the user U2 is in the extraction area EA. This makes it possible to produce an effect such as changing the drivers after the user U2 enters the car.

It should be noted that embodiments of the present invention are not limited to that described above. For example, the captured image acquisition section 50 of the game console 12 may acquire captured images from a camera which is not the stereo camera 16.

Further, for example, the game console 12 may receive a distance distribution measurement result from a distance distribution measurement section. The distance distribution measurement section emits infrared radiation and measures the time it takes for infrared radiation to be reflected by an object to be imaged and return to the distance distribution measurement section, thus measuring distance distribution between a subject and the game console 12 on the basis of the measured time.

Still further, for example, the game console 12 may receive a distance distribution measurement result from a distance distribution measurement section. The distance distribution measurement section includes a plurality of lenses having different focal distances and measures distance distribution between a subject and the game console 12 on the basis of the lens which brings the subject in focus of all the lenses.

The invention claimed is:

1. An information processor comprising:
 a captured image acquisition section configured to acquire a captured image including a face of a user;
 a face position identification section configured to identify a position of the face of the user included in the captured image;
 an operation area setting section configured to set an operation area at a position on the captured image adjacent the face of the user, the operation area being smaller than the captured image and being a detection area, any remaining areas of the captured image not established as detection areas being non-detection areas; and
 an operation reception section configured to ignore for purposes of detection any non-detection areas and to detect a detection target from within the operation area, and receive, as a user-pointed position, a position on a display image corresponding to a relative position of the detected detection target within the operation area such that a horizontal distance of the user-pointed position from a vertical edge of the display image is proportional in a ratio to a horizontal distance of the target position from a corresponding vertical edge of the operation area and such that a vertical distance of the user-pointed position from a horizontal edge of the display image is proportional in the ratio to a vertical distance of the target position from a corresponding horizontal edge of the operation area.

2. The information processor of claim 1, wherein the operation reception section detects, from within the operation area, a hand of the user as the detection target.

3. The information processor of claim 2, wherein
 the captured image acquisition section acquires two images captured by a stereo camera and generates, on the basis of the two captured images, distance distribution data representing a distance distribution from the stereo camera to a subject, and
 the operation reception section detects a position of the subject closest to the stereo camera within the operation area as a position of the hand of the user.

4. The information processor of claim 1, wherein the operation reception section detects a controller held by the user in his or her hands from within the operation area as the detection target.

5. The information processor of claim 4, wherein
 the controller has a light-emitting section, and
 the operation reception section detects a position of a light emitted from the light-emitting section from within the operation area as a position of the controller.

6. The information processor of claim 1, wherein
 the captured image includes two faces of first and second users,
 the face position identification section identifies positions of the respective faces of the first and second users,
 the operation area setting section sets first operation area on the captured image in accordance with the position of the face of the first user and sets second operation area on the captured image in accordance with the position of the face of the second user, and
 the operation reception section receives, as a position pointed to by the first user, a position on the screen corresponding to a relative position of the detection target detected within the first operation area and receives, as a position pointed to by the second user, a position on the screen corresponding to a relative position of the detection target detected within the second operation area.

7. The information processor of claim 1 further comprising:
 a display image generation section configured to generate a display image by arranging an object within the captured image and display the display image on a screen of a display device, wherein
 the display image generation section determines the position where the object is arranged in accordance with the position of a controller held by the user in his or her hands detected from within the captured image.

8. A control method for controlling an information processor to perform a process that matches an operation input from a user, the control method comprising:
 acquiring a captured image including a face of a user;
 identifying a position of the face of the user included in the captured image;
 setting an operation area at a position on the captured image adjacent the face of the user, the operation area being smaller than the captured image and being a detection area, any remaining areas of the captured image not established as detection areas being non-detection areas; and
 ignoring for purposes of detection any non-detection areas and detecting a detection target from within the operation area, and receiving, as a user-pointed position, a position on a display image corresponding to a relative position of the detected detection target within the operation area such that a horizontal distance of the user-pointed position from a vertical edge of the display image is proportional in a ratio to a horizontal distance of the target position from a corresponding vertical edge of the operation area and such that a vertical distance of the user-pointed position from a horizontal edge of the display image is proportional in the ratio to a vertical distance of the target position from a corresponding horizontal edge of the operation area.

9. An apparatus comprising a computer operable to execute a computer program for causing a computer to function as:
 a captured image acquisition section acquiring a captured image including a face of a user;
 a face position identification section identifying a position of the face of the user included in the captured image;
 an operation area setting section setting an operation area at a position on the captured image adjacent the face of the user, the operation area being smaller than the captured image and being a detection area, any remaining areas of the captured image not established as detection areas being non-detection areas; and
 an operation reception section ignoring for purposes of detection any non-detection areas and detecting a detection target from within the operation area, and receiving, as a user-pointed position, a position on a display image corresponding to a relative position of the detected detection target within the operation area such that a horizontal distance of the user-pointed position from a vertical edge of the display image is proportional in a ratio to a horizontal distance of the target position from a corresponding vertical edge of the operation area and such that a vertical distance of the user-pointed position from a horizontal edge of the display image is proportional in the ratio to a vertical distance of the target position from a corresponding horizontal edge of the operation area.

10. A non-transitory, computer-readable information storage medium storing a program for a computer, the program including:

acquiring a captured image including a face of a user;

identifying a position of the face of the user included in the captured image;

setting an operation area at a position on the captured image adjacent the face of the user, the operation area being smaller than the captured image and being a detection area, any remaining areas of the captured image not established as detection areas being non-detection areas; and ignoring for purposes of detection any non-detection areas and detecting a detection target from within the operation area, and receiving, as a user-pointed position, a position on a display image corresponding to a relative position of the detected detection target within the operation area such that a horizontal distance of the user-pointed position from a vertical edge of the display image is proportional in a ratio to a horizontal distance of the target position from a corresponding vertical edge of the operation area and such that a vertical distance of the user-pointed position from a horizontal edge of the display image is proportional in the ratio to a vertical distance of the target position from a corresponding horizontal edge of the operation area.

* * * * *